Nov. 17, 1964     L. M. BIRCHMIER ETAL     3,156,947
POULTRY SHACKLES
Filed May 15, 1963
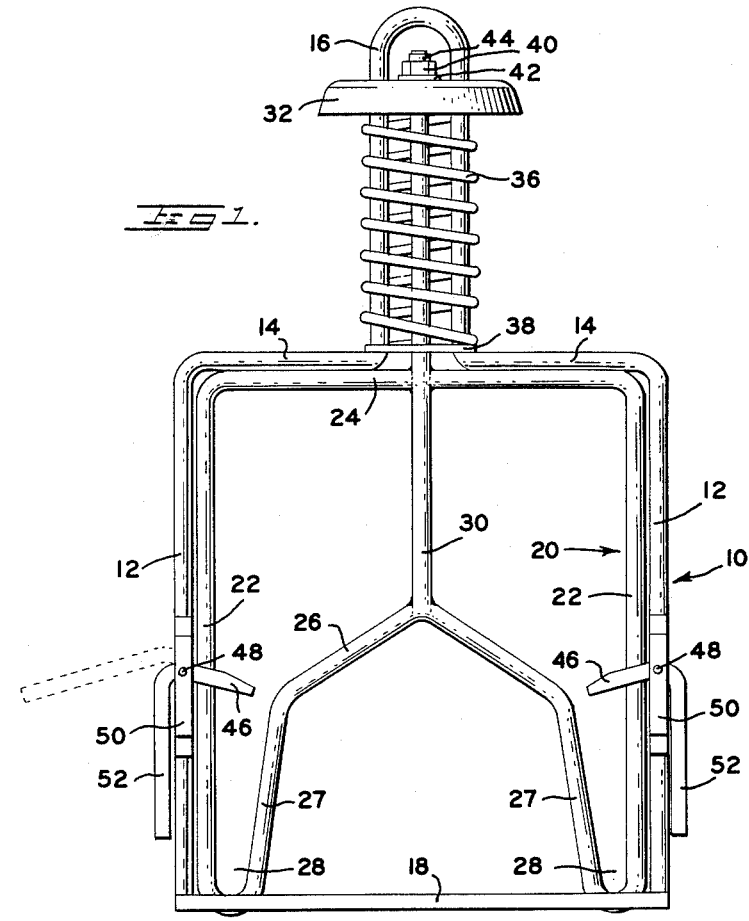
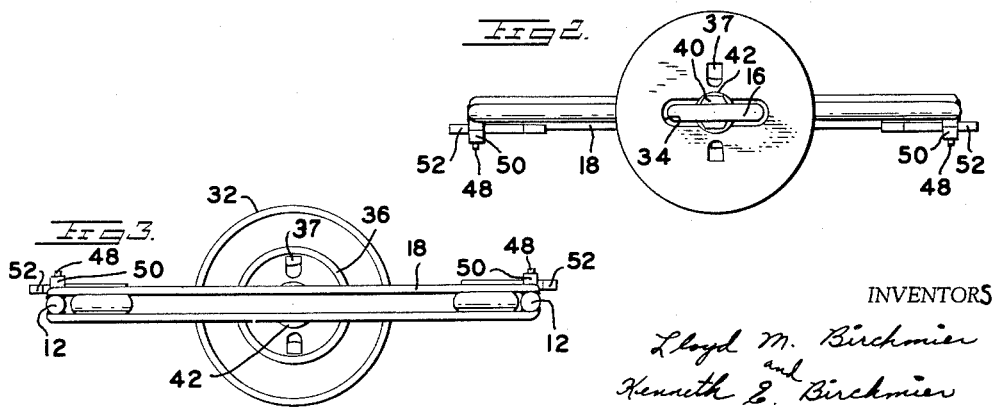
INVENTORS
Lloyd M. Birchmier
Kenneth E. Birchmier
BY Watson, Cole, Grindle & Watson
ATTORNEYS

United States Patent Office 3,156,947
Patented Nov. 17, 1964

3,156,947
POULTRY SHACKLES
Lloyd M. Birchmier, Ottumwa, and Kenneth E. Birchmier, Pulaski, Iowa, assignors to L.B. Products Company, Ottumwa, Iowa, a corporation of Iowa
Filed May 15, 1963, Ser. No. 280,621
6 Claims. (Cl. 17—44.1)

This invention relates to improvements in poultry shackles of the type disclosed in the patent to Edward T. Wayne No. 3,044,109, granted July 17, 1962.

Such shackles are intended to support fowls such as turkeys while they are being killed, scalded, picked and/or eviscerated or otherwise treated during processing operations. In such devices it has been customary for many years to provide the shackles with downwardly converging loops or notches for holding the legs of the fowl throughout the processing operation and for automatically releasing or ejecting the legs from these notches at the conclusion of the operation. Certain species of fowl, especially turkeys, often struggle when shackled and in doing so are frequently able to free at least one leg from shackles, such as heretofore employed. Moreover, the legs are sometimes freed from such conventional shackles by the tendency of the fowl to float when it is drawn through the scalding machine. The difficulty of providing a firm grip on the legs of turkeys especially is complicated due to the wide variation of sizes between the legs of different species and sexes of turkeys.

Despite these difficulties, it has heretofore been impractical to lock or retain the turkey or fowl legs in the shackles by means which would obstruct or overlie the upper ends of respective notches or loops, inasmuch as this would interfere both with the placing of the turkey or fowl legs within the notches as well as with the automatic ejection of the legs from the notches at the conclusion of the operations.

It is accordingly the primary object of the present invention to improve a poultry shackle of the type above discussed by the combining therewith of a novel latch or locking structure for positively retaining the legs of the poultry within the notches or loops when the various conventional parts of the shackle are in their gripping position, but which at such time will permit nevertheless the ready insertion of the poultry legs into the notches without interference.

It is a further primary object to provide in such a device, latch or lock members which, though readily retractable as above mentioned responsive to the downward movement of the poultry legs into the notches, are positively positioned against retraction by upward movement of the legs from the notches, but which are nevertheless raised clear of the notches to permit automatic ejection of the poultry legs therefrom at the conclusion of the operations.

In the present application there is shown only the preferred embodiment of our invention simply by way of exemplification of the preferred mode of carrying our invention into practice. However, it will be readily understood that our invention is capable of other and different embodiments such as will be obvious to persons of ordinary skill in this art.

In the accompanying drawing:

FIGURE 1 is a front elevation of a poultry shackle in accordance with the preferred embodiment of the invention, and showing in broken lines one of the latches in its released or retracted position.

FIGURE 2 is a plan view of the shackle shown in FIGURE 1.

FIGURE 3 is a bottom plan view of the shackle shown in FIGURE 1.

Referring now in detail to the accompanying drawing, the shackle illustrated therein comprises a main supporting frame 10 formed of preferably noncorrosive metal rod stock bent to the desired configuration and including the relatively parallel vertical legs 12 disposed in spaced relation. These legs have horizontal shoulders or shoulder portions 14 connected thereto at their upper ends and the said shoulders are interconnected integrally by a vertically upwardly projecting suspension shank or loop 16, by which the entire device is adapted to be suspended from and transported along a conveyor in a manner well-known in the art whereby the fowl or poultry suspended from the shackle may be carried through the various processing stations. Extending between and welded or otherwise fixed to the lower ends of the depending legs 12 are the generally horizontal ejection bars 18. These as will be seen in FIGURES 2 and 3 are preferably disposed in parallel relation on opposite sides of the respective legs, whereby the inner gripping frame 20 may be slidably guided between them.

The gripping frame 20 in its entirety is guided on the supporting frame 10 for vertical movement between predetermined gripping and releasing positions, the gripping position being that shown in FIGURE 2, wherein the frame 20 is raised to its fullest extent within the supporting frame 10.

In the exemplified embodiment the inner or gripping frame 20 also is shown as being fabricated primarily from a suitable rod stock of a corrosion resistant metal, including depending vertical sides 22 adapted for reception between and sliding engagement with the depending legs 12 of the frame 10. These are interconnected at their upper ends by a horizontal cross bar 24 adapted for abutting engagement with the shoulders 14 to limit the upward movement of the inner frame and thereby to determine the operative gripping position of the device. The lower ends of the respective legs 22 are interconnected by an upwardly bowed portion or section 16 in such manner as to cooperate with the respective legs 22 in forming the relatively horizontally spaced notches or loops 28 open at their upper ends for reception of the legs of a fowl. Preferably the portions 27 of the loop 26, defining the inner sides of the respective notches 28, diverge upwardly and inwardly away from their associated legs 22 respectively whereby the notches 28 may be of downwardly converging shape for wedging reception of the poultry legs. Fixed to and extending upwardly from the mid-portion of the section 26 is the operating or control stem 30. In the embodiment shown it will be seen that the portions 22, 24, 26 and 27 of the inner gripping frame 20 are all formed from a single length of rod material, the opposite end portions of which are constituted by the crosspieces 24. These terminate in spaced relation and the stem 30 extends between and is welded or otherwise fixedly connected to them.

At its free upper end the stem 30 projects between the opposed parallel sides of the suspension loop 16 and has affixed thereto an operating cam follower or washer 32. This washer is formed with a diametrical slot 34 for the slidable reception of the loop 16, the loop and washer thus cooperating to assist in guiding the frames 10 and 20 in their relative movement. The spring 36, which is disposed about the loop under compression between the washer 32 and the shoulders 14 of the outer suspension frame, exemplifies any suitable resilient means operatively interconnected between the two frames 10 and 20 for resiliently urging the gripping frame upwardly toward its operative gripping position. Tabs 37 pressed downwardly from the washer 32 may be employed to assist in centering the spring 36 with respect to the washer.

For affixing the cam follower or washer 32 to the upper end of the stem 30, there are employed the relatively opposed nuts 40—40 and washers 42—42 threaded onto the stem 30 above and below the face of the washer 32 the rod being disposed through the slot 34 concentrically to the washer. It is desirable to provide means such as the yoke 38 interconnecting the lower ends of the legs of loop 16 at their junctures with shoulders 14 respectively to prevent spreading of these legs such as might cause them to bind against the ends of the slot 34 in washer 32. Also it is desirable to apply a lock nut 44 in accordance with conventional practice.

Carried by the main frame 10 for cooperation with the respective notches or loops 28 of the gripping frame 20 are releasable retention means exemplified by the latches 46 respectively pivotally connected at 48 to the legs 12 of the supporting frame. It is desirable also to provide on each leg a bracket 50, the ends of which are welded or otherwise fixedly connected to the leg 12 and the midportion of which is spaced from the leg so that the latch may be swingably received on the pivot 48 between the midportion of the bracket 50 and the leg 12, the bracket in such case providing a support for the outer end of the pivot 48 and also serving to some extent as a guide for the latch 46 in its swinging movement.

Each latch when in its operative position (as shown in full lines in FIGURE 1) normally projects in a genrally horizontal direction across the upper end of its associated notch 28, and is so arranged that while it is freely swingable or yieldable downwardly to an inoperative position at one side of the notch (as shown in broken lines in FIGURE 1) under the pressure exerted thereagainst by a poultry leg being inserted into the notch, it is positively held against upward yielding movement to prevent the unintentional release of the legs in an upward direction. To this end each latch 46 is normally retained in its operative blocking or obstructting position with respect to its associated notch 28 as shown in full lines in FIGURE 1, this being achieved in the present embodiment by the depending lever arm 52. In the present showing such arm 52 is disposed at nearly right angles to the latch 46 and is integrally rigidly connected therewith, the arm 52 being of greater length and weight than the latch 46 and functioning as a pendulum actuated by gravity to yieldably urge the latch 46 upwardly to its full line operative position in FIGURE 1. However, upward swinging of the latch 46 substantially beyond its said obstructing or blocking position is prevented by abutting engagement of the pendulum arm 52 with the lower end portion of the bracket 50 and/or with the frame leg 12 or other suitable stop means.

In the operation of the invention, the poultry shackle will be normally suspended from the conveyor by its suspension loop 16 whereby the turkey or other poultry carried by the shackle may be carried through the various processing stations. When the shackle approaches the end of the processing steps the cam follower 32 is engaged by a stationary sloping cam surface disposed adjacent the conveyor and arranged to depress the cam follower 32 as well as the entire gripping frame 20 of which it constitutes part. The ensuing movement of the notches or loop portions 28 of the frame downwardly between the bars 18 results in the bars 18 supporting the legs of the poultry so that they may relatively move upwardly through the upper ends of the loops 28 to be automatically released.

Since the latches 46 are carried by the outer frame 10 at a location well above the bars 18, they will in no manner interfere with the automatic release in this manner. On the other hand they afford positive obstructions across the upper ends of the loops 28 when the inner gripping frame 20 is in its raised gripping position as in FIGURE 1, so that the legs of the poultry cannot be unintentionally or accidentally released. However, when the poultry is initially placed in the shackle at the beginning of the processing operation, at which time the parts will normally be in the gripping position as illustrated in FIGURE 1, the latches 48 will be free to swing or move downwardly and to one side to inoperative positions with respect to the upwardly opening mouths of the notches or loops 28 and this may be accomplished simply by the pressure of the fowl legs against these latches during their downward movement. However, as soon as the legs have passed them they will automatically be returned by the action of their associated pendulums 52 to their operative obstructing positions without further attention on the part of the workman.

It will thus be apparent that we have conceived a poultry shackle having a great reliabilty in its holding action and in which the retention means for providing this reliability are of simple, economical construction, and in no way detract from either the ease of placing poultry therein, or the automatic ejection of poultry therefrom.

Having thus described our invention, we claim:

1. A poultry shackle comprising a main supporting frame adapted for suspension from and movement with a conveyor, an auxiliary gripping frame guided on said supporting frame for vertical movement between predetermined relatively raised and lowered gripping and releasing positions respectively, said gripping frame being formed to define a pair of relatively horizontally spaced vertically extending notches open at their upper ends for reception of the legs of a fowl, resilient means operatively interconnected between said frames for resiliently urging said gripping frame upwardly relative to the supporting frame toward its gripping position, said main frame including a substantially horizontal release bar normally at the level of the lower ends of said notches in the gripping position of said gripping frame, said bar extending across and closely adjacent said notches, whereby the legs of a fowl positioned in said notches will project above and across said bar, and relatively movable toward the open upper ends of said notches to raise and release the legs of the fowl therefrom as said auxiliary frame moves downwardly toward its release position, in combination with latches carried by said supporting frame, said latches normally extending across and obstructing the open upper ends of the respective notches in the raised gripping position of said gripping frame to prevent removal of the said legs of the fowl through said open upper ends, the movement of said gripping frame to releasing position moving the open upper ends of said notches away from the respective latches and toward said release bar to automatically eject the said legs from the notches without interference from said latches as the open upper ends of the said notches move downwardly relative to said bar.

2. A poultry shackle as defined in claim 1 wherein said latches are mounted on the supporting frame for movement between operative positions in vertical alignment with the respective notches and inoperative positions substantially out of vertical alignment with the respective notches, said shackle including means yieldably urging said latches toward their obstructing positions, said latches being disposed for movement from their operative positions under the pressure of objects moving downwardly into their associated notches, and means positively positioning said latches against displacement from their operative positions by the pressure of upwardly moving objects in their respective associated notches.

3. A poultry shackle as defined in claim 1 in which each said latch is pivotally connected to the main frame for movement from a downwardly swung inoperative position to a raised, generally horizontal operative position in alignment with its associated notch, means for yieldably urging the latch from its inoperative position toward its operative position, and means for positively preventing movement of the latch beyond its said operative position.

4. A poultry shackle as defined in claim 1 in which each said latch is pivotally connected to the main frame for swinging movement from a depending inoperative position at one side of its associated notch to a generally horizontal operative position in which it projects partially across said notch in a position of vertical alignment therewith, each said latch including a pendulum arm rigidly connected thereto and extending substantially at right angles therefrom for yieldably maintaining said latch in its operative position.

5. A poultry shackle as defined in claim 4 including a stop carried by the main frame and projecting into the path of movement of said latch for preventing its upward swinging movement beyond its said operative position.

6. A poultry shackle comprising a main supporting frame adapted for suspension from and movement with a conveyor, an auxiliary gripping frame guided on said supporting frame for vertical movement between predetermined relatively raised and lowered gripping and releasing positions respectively, said gripping frame being formed to define a pair of relatively horizontally spaced vertically extending notches open at their upper ends for reception of the legs of a fowl, resilient means operatively interconnected between said frames for resiliently urging said gripping frame upwardly relative to the supporting frame toward its gripping position, and latch means carried by said supporting frame in position to project at least partially across and obstruct the open upper ends of the respective notches in the raised gripping position of said gripping frame, whereby movement of said gripping frame to its releasing position will result in movement of the open upper ends of said notches away from the latch means to permit removal of the said legs of a fowl through said open upper ends of the notches.

References Cited by the Examiner
UNITED STATES PATENTS

| | | | |
|---|---|---|---|
| 1,742,569 | 1/30 | Barker et al. | 17—44.1 |
| 2,819,489 | 1/58 | Shadley | 17—44.1 |
| 3,044,109 | 7/62 | Wayne | 17—44.1 |

References Cited by the Applicant
UNITED STATES PATENTS

| | | |
|---|---|---|
| 3,113,341 | 12/63 | Lewis |
| 3,134,135 | 5/64 | Harben |

SAMUEL KOREN, *Primary Examiner.*
LUCIE H. LAUDENSLAGER, *Examiner.*